M. IHNAT.
FENDER.
APPLICATION FILED JULY 12, 1917.
1,240,216.
Patented Sept. 18, 1917.
2 SHEETS—SHEET 2.
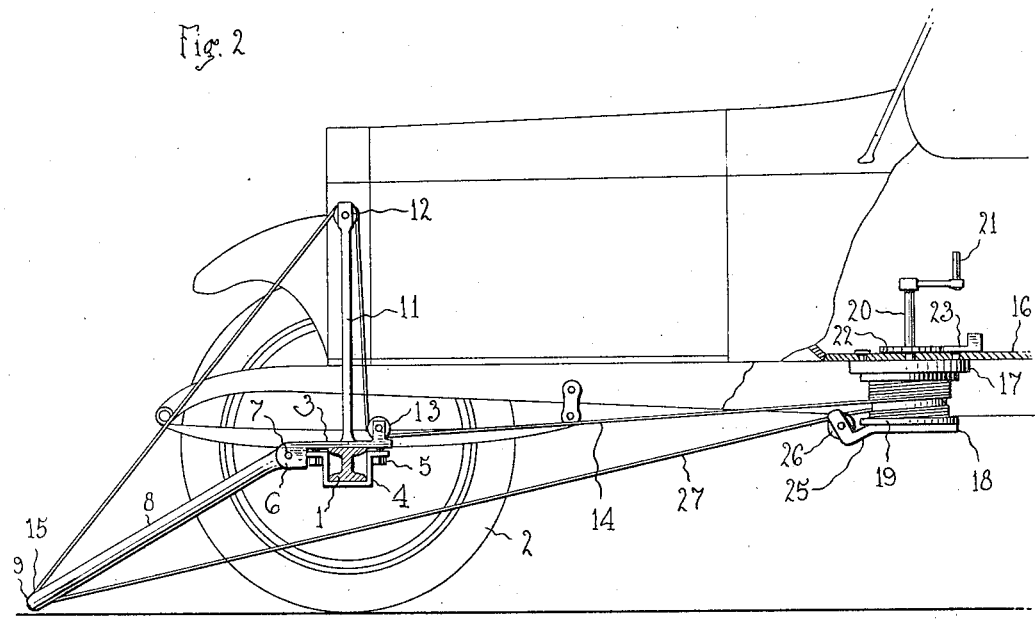
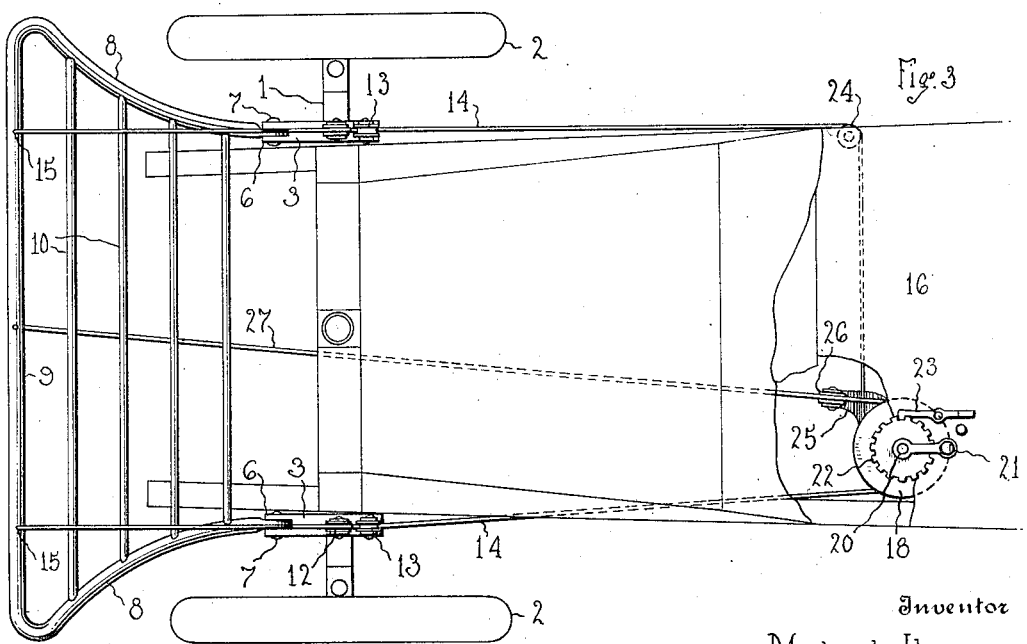
Witnesses
Arthur F. Draper
Karl H. Butler
Inventor
Michael Ihnat
By
Attorneys

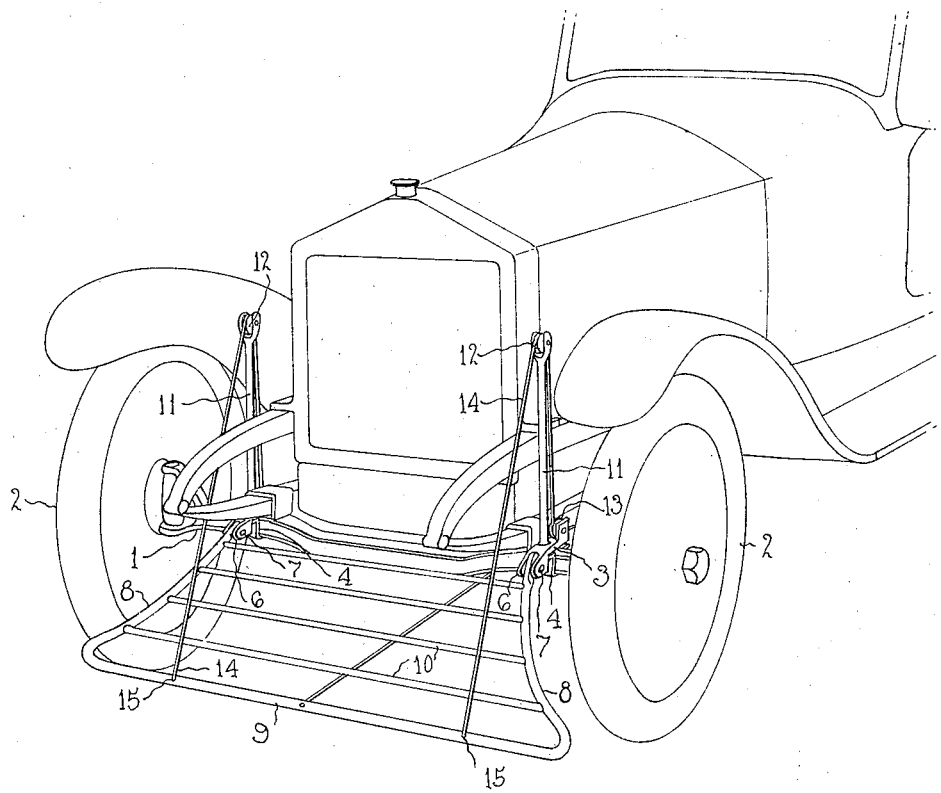

UNITED STATES PATENT OFFICE.

MICHAEL IHNAT, OF DETROIT, MICHIGAN.

FENDER.

1,240,216.   Specification of Letters Patent.   Patented Sept. 18, 1917.

Application filed July 12, 1917. Serial No. 180,059.

*To all whom it may concern:*

Be it known that I, MICHAEL IHNAT, a citizen of the United States of America, residing at Detroit, in the county of Wayne and State of Michigan, have invented certain new and useful Improvements in Fenders, of which the following is a specification, reference being had therein to the accompanying drawings.

This invention relates to fenders for automobiles and other vehicles, and the object of my invention is to provide a simple and durable fender that may be easily and quickly attached to the front axle of an automobile or other vehicle to provide a guard or shield in front of the vehicle that will prevent pedestrians or animals from being unduly injured when run down by the vehicle.

Another object of my invention is to furnish novel means for holding the front edge or end of a fender relative to the front axle of an automobile so that the fender cannot bounce and swing when the automobile encounters rough streets or roads, said means permitting of the fender being raised or adjusted to provide clearance for obstructions that might otherwise break the fender.

A further object of my invention is to accomplish the above results by a mechanical construction that will be hereinafter specifically described and then claimed. Reference will now be had to the drawings, where—

Figure 1 is a perspective view of a fender applied to the front axle of an automobile;

Fig. 2 is a side elevation of the same, showing portions of the automobile in section, and Fig. 3 is a plan of the fender as attached to the automobile.

In the drawings, 1 denotes the front axle of an automobile and at the ends of the axle are the usual wheels 2. Mounted on the axle, adjacent the spring perches, are plates 3 held in engagement with the axle by straps 4 embracing the axle and connected to the plates 3 by screw bolts 5 or other fastening means. The forward ends of the plates 3 have apertured ears 6 and pivotally connected thereto by pins 7 are the curved side arms 8 of a fender frame 9. This fender frame has the side arms 8 thereof connected by transverse rods 10, but said frame may be of any well known construction that will support bodies, should the same fall thereon.

The plates 3 are provided with uprights 11, and revoluble in the upper ends of said uprights are sheaves 12. Sheaves 13 are also mounted on the rear ends of the plates 3 and trained over and under said sheaves are cables 14 having the forward ends thereof connected to the fender frame 9, as at 15.

The floor 16 of the automobile, adjacent the dash and the operator's seat, is provided with supports 17 and 18 for a revoluble drum 19, said drum being disposed horizontally with a shaft 20 extending through the floor 16 and provided with a crank handle 21, so that the drum may be easily revolved by the operator or occupant of the automobile. On the shaft 20 is a toothed wheel 22, and pivoted on the floor 16 is a dog 23 that may be shifted into and out of engagement with the toothed wheel 22, said dog preventing accidental movement of the drum 19, it being necessary to kick the dog out of engagement with the toothed wheel to rotate the drum in either direction.

At the opposite side of the automobile from the drum and in longitudinal alinement with the sheave 13 at that side of the automobile is a horizontal sheave 24 over which is trained one of the cables 14, and both of the cables are attached to the drum 19 to be wound and unwound thereon.

The support 18 of the drum has a bracket 25 for a sheave 26 and trained over said sheave is a cable 27 attached to the drum and to the fender frame 9, this single cable being wound on the drum 19 in an opposite direction from the cables 14, so that when the drum is locked against rotation, the fender frame 9 will be practically fixed relative to the front axle, and cannot bounce or shift when rough pavements are encountered by the automobile.

The drum 19 permits of the forward edge or end of the fender frame being properly set or spaced from a pavement, and when country roads are encountered, the fender may be elevated to an inactive position. Should small animals or pedestrians be encountered, it is only necessary to kick out the dog 23 and the fender will immediately assume an active position, to scoop up or cast to one side persons or animals that may be run down.

One embodiment of my invention has been illustrated, but it is to be understood that the structural elements are susceptible to such changes, in size, shape and manner of assemblage as fall within the scope of the appended claims.

What I claim is:—

1. The combination with an automobile having a front axle, of plates attached to said axle, a fender frame pivotally connected to said plates, uprights on said plates, a sheave carried by each plate and each upright, cables attached to the front edge of said fender frame and trained over and under said sheaves respectively, a rotatable drum supported by the floor of said automobile and to which said cables are attached and adapted to be wound thereon and unwound therefrom, a drum shaft extending through the floor of the automobile so that said drum may be manually rotated, means for holding said drum against accidental rotation, and a cable attached to the front edge of said fender frame and to said drum and wound thereon in an opposite direction from the first mentioned cables.

2. The combination with an automobile having a front anxle provided with wheels, of plates attached to said front axle, a fender frame pivotally connected to said plates and extending in front of said wheels, a drum supported from the floor of the automobile, a shaft extending through the floor of the automobile for imparting movement to said drum, cables above and below said fender frame attached to the front edge thereof and to said drum and adapted to be wound thereon and unwound therefrom for adjusting said fender frame, and means adapted to prevent accidental rotation of said shaft.

In testimony whereof I affix my signature in presence of two witnesses.

MICHAEL IHNAT.

Witnesses:
KARL H. BUTLER,
ANNA M. DORR.

Copies of this patent may be obtained for five cents each, by addressing the "Commissioner of Patents, Washington, D. C."